US006251280B1

(12) United States Patent
Dai et al.

(10) Patent No.: US 6,251,280 B1
(45) Date of Patent: Jun. 26, 2001

(54) IMPRINT-COATING SYNTHESIS OF SELECTIVE FUNCTIONALIZED ORDERED MESOPOROUS SORBENTS FOR SEPARATION AND SENSORS

(75) Inventors: Sheng Dai, Knoxville; Mark C. Burleigh, Lenoir City, both of TN (US); Yongsoon Shin, Richland, WA (US)

(73) Assignees: University of Tennessee Research Corporation, Knoxville; U. T. Battelle, LLC, Oak Ridge, both of TN (US)

( * ) Notice: Subject to any disclaimer, the term of this patent is extended or adjusted under 35 U.S.C. 154(b) by 0 days.

(21) Appl. No.: 09/396,067

(22) Filed: Sep. 15, 1999

(51) Int. Cl.[7] .................................................. B01D 15/08
(52) U.S. Cl. ........................ 210/656; 210/660; 210/681; 210/198.2; 210/502.1; 210/635; 502/400; 502/407; 502/408; 502/439; 501/39
(58) Field of Search ..................................... 210/635, 656, 210/660, 681, 198.2, 502.1; 502/400, 407, 439, 408; 501/39

(56) References Cited

U.S. PATENT DOCUMENTS 5,624,875 * 4/1997 Nakanishi ............................. 501/39

5,814,223 * 9/1998 Hjerten .............................. 210/198.2

OTHER PUBLICATIONS

Badiei, A.R. et al. "Modification of Mesoporous Silica by Direct Template Ion Exchange Using Cobalt Complexes." *Inorg. Chem.*, vol. 37, pp. 4142–4145 (1998).

Baker, A. et al. "The Ligand Field Spectra of Copper(II) Complexes." *J. Chem. Edu.*, vol. 75, pp. 98–99 (1998).

(List continued on next page.)

*Primary Examiner*—Ernest G. Therkorn
(74) *Attorney, Agent, or Firm*—Kilpatrick Stockton LLP

(57) ABSTRACT

The present invention relates generally to mesoporous sorbent materials having high capacity, high selectivity, fast kinetics, and molecular recognition capability. The invention also relates to a process for preparing these mesoporous substrates through molecular imprinting techniques which differ from convention techniques in that a template molecule is bound to one end of bifunctional ligands to form a complex prior to binding of the bifunctional ligands to the substrate. The present invention also relates to methods of using the mesoporous sorbent materials, for example, in the separation of toxic metals from process effluents, paints, and other samples; detection of target molecules, such as amino acids, drugs, herbicides, fertilizers, and TNT, in samples; separation and/or detection of substances using chromatography; imaging agents; sensors; coatings; and composites.

53 Claims, 5 Drawing Sheets

ORDERED MESOPORES COATED
WITH THE CONVENTIONAL METHOD

ORDERED MESOPORES COATED
WITH THE SURFACE IMPRINTING METHOD

OTHER PUBLICATIONS

Barrett, E.P. et al. "The Determination of Pore Volume and Area Distributions in Porous Substances. I. Computations from Nitrogen Isotherms." *J. Am. Chem. Soc.,* vol. 73, pp. 373–375 (1951).

Beck, J.S. et al. "A New Family of Mesoporous Molecular–Sieves Prepared with Liquid Crystal Templates." *J. Am. Chem. Soc.,* vol. 114, pp. 10834–10843 (1992).

Brady, P.A. et al. "Selection Approaches to Catalyticc Systems." *Chem. Soc. Rev.,* vol. 26, pp. 327–336 (1997).

Brown, J. et al. "Selective Adsorption of $Hg^{2+}$ by Thiol–Functionalized Nanoporous Silica." *Chem. Commun.,* pp. 69–70 (1999).

Caravajal, G.S. et al., "Structural Characterization of 93–Amonopropyl) Triethoxy Modified Silicas by Silicon–29 and Carbon–13 Nuclear Magnetic Resonance." *Anal. Chem.,* vol. 60, pp. 1776–1786 (1988).

Cassol, A. et al. "Thermodynamic and Spectroscopic Investigations on the Interaction of Uranyl(VI) with Neutral N– and O–Donors in Dimethyl Sulfoxide." *J. Chem. Soc. Dalton Trans.,* pp. 733–739 (1995).

Chen, C.Y. et al. "Studies on Mesoporous Materials I. Synthesis and Characterization of MCM–41." *Microporous Mater.,* vol. 2, pp. 17–22 (1993).

Chiang, C.H. et al. "The Structure of γ–Aminopropyltriethoxysilane on Glass Surfaces." *J. Collold Inter. Sci.,* vol. 74, pp. 396–404 (1980).

Clearfield, A. "Role of Ion–Exchange in Solid–State Chemistry." *Chem.Rev.,* vol. 88, pp. 125–148 (1988).

Corma, A. "From Microporous to Mesoporous Molecular Sieve Materials and Their Use in Catalysis." *Chem. Rev.,* vol. 97, pp. 2373–2419 (1997).

Dai, S. et al. "Spectroscopic Probing of Adsorption of Uranyl to Uranyl–Imprinted Silica Sol–Gel Glass via Steady–State and Time–Resolved Fluorescence Measurement." *J. Phys. Chem. B,* vol. 101, pp. 5521–5524 (1997).

Dai, S. et al. "Enhancement of Uranyl Adsorption Capacity and Selectivity on Silica Sol–Gel Glasses via Molecular Imprinting." *Chem. Mater.,* vol. 9, pp. 2521–2525 (1997).

De, G. et al. "Uniformly Dispersed $Pr^{+}$ Doped Silica Glass by the Sol–Gel Process." *J. Non–Cryst. Solids,* vol. 201, pp. 153–158 (1996).

Diaz, J.F. et al., "Synthesis and Characterization of Cobalt–Complex Functionalized MCM–41." *Chem. Mater.,* vol. 9, pp. 61–67 (1997).

Echchahed, B. et al. "Iron–Modified MCM–48 Mesoporous Molecular Sieves." *Chem. Mater.,* vol. 9, pp. 1716–1719 (1997).

Feng, X. et al. "Functionalized Monolayers on Ordered Mesoporous Supports." *Science,* vol. 276, pp. 923–926 (1997).

Firouzi, A. et al. "Cooperative Organization of Inorganic––Surfactant and Biomimetic Assemblies." *Science,* vol. 267, pp. 1138–1143 (1995).

Huo, Q. et al. "Generalized Synthesis of Periodic Surfactant/Inorganic Composite Materials." *Nature,* vol. 368, pp. 317–321 (1994).

Huo, Q. et al. "Preparation of Hard Mesoporous Silica Spheres." *Chem. Mater.,* vol. 9, pp. 14–17 (1997).

Ince, H. et al. "Sorption and Preconcentration of Copper and Cadmium on Silica–Gel Modified with 3–Aminopropyltriethoxysilane." *Fresenius J. Anal. Chem.,* vol. 342, pp. 560–562 (1992).

Kabanov, V.A. et al. "Complex–Forming Polymeric Sorbents with Macromolecular Arrangement Favorable for Ion Sorption." *J. Appl. Polym. Sci.,* vol. 24, pp. 259–267 (1979).

Klonkowski, A.M. et al. "Cu(II) Complexes in Organically Modified Silicate Gels." *J. Non–Cryst. Solids,* vol. 129, pp. 101–108 (1991).

Kresge, C.T. et al. "Ordered Mesoporous Molecular Sieves Synthesized by a Liquid–Crystal Template Mechanism." *Nature,* vol. 359, pp. 710–712 (1992).

Kuchen, W. et al. "Metal–Ion–Selective Exchange Resins by Matrix Imprint with Methacrylates." *Angew. Chem. Int. Ed. Engl.,* vol. 27, pp. 1695–1697 (1988).

Liu, J. et al. "Hybrid Mesoporous Materials with Functionalized Monolayers." *Adv. Mater.,* vol. 10, pp. 161–165 (1998).

Mallouk, T.E. et al., "Molecular Recognition in Lamellar Solids and Thin Films." *Acc. Chem. Res.,* vol. 31, pp. 209–217 (1998).

Mercier, L. et al. "Heavy Metal Ion Adsorbents Formed by the Grafting of a Thiol Functionality to Mesoporous Silica Molecular Sieves: Factors Affecting Hg(II) Uptake." *Environ. Sci. Technol.,* vol. 32, pp. 2749–2754 (1998).

Mercier, Louis et al. "Access in Mesoporous Materials: Advantages of a Uniform Pore Structure in the Design of a Heavy Metal Ion Adsorbent for Environmental Remediation." *Advanced Materials,* vol. 9, No. 6, pp. 500–503 (1997).

Mosbach, K. "Molecular Imprinting." *Trends Biochem. Sci.,* vol. 19, pp. 9–14 (1994).

Nishide, H. et al. "Adsorption of Metal Ions on Crosslinked Poly(4–vinylpyridine) Resins Prepared with a Metal Ion as Template." *J. Polym. Sci.,* vol. 15, pp. 3023–3029 (1977).

Shea, K.J. "Molecular Imprinting of Synthetic Network Polymers: The De Novo Synthesis of Macromolecular Binding and Catalytic Sites." *Trends Polym. Sci.,* vol. 2, pp. 166–184 (1994).

Shea, K.J. et al. "Molecular Recognition of Synthetic Amorphous Surfaces—The Influence of Functional Group Positioning on the Effectiveness of Molecular Recognition." *J. Am. Chem. Soc.,* vol. 108, pp. 1091–1093 (1986).

Steinke, J. et al. "Imprinting of Synthetic Polymers Using Molecular Templates." *Adv. Polym. Sci.,* vol. 123, pp. 81–125 (1995).

Tanve, P.T. et al. "A Neutral Templating Route to Mesoporous Molecular Sieves." *Science,* vol. 267, pp. 865–867 (1995).

Tanev, P.T. et al. "Mesoporous Silica Molecular Sieves Prepared by Ionic and Neutral Surfactant Templating: A Comparison of Physical Properties." *Chem. Mater.,* vol. 8, pp. 2068–2079 (1996).

Tsukagoshi, K. et al. "Metal Ion–Selective Adsorbent Prepared by Surface–Imprinting Polymerization." *Bull. Chem. Soc. Jpn.,* vol. 66, pp. 114–120 (1993).

Tsukagoshi, K. et al. "Surface Imprinting—Characterization of a Latex Resin and the Origin of the Imprinting Effect." *Bull. Chem. Soc. Jpn.,* vol. 68, pp. 3095–3103 (1995).

Wulff, G. "Molecular Imprinting in Cross–Linked Materials with the Aid of Molecular Templates—A Way Toward Artificial Antibodies." *Angew. Chem. Int. Ed. Engl.,* vol. 34, pp. 1812–1832 (1995).

Wulff, G. et al. "Molecular Recognition Through the Exact Placement of Functional Groups on Rigid Matrices via a Template Approach." *J. Am. Chem. Soc.,* vol. 108, pp. 1089–1091 (1986).

Yoshino, A. et al. "Kinetics of Interaction of 3–aminopropyltriethoxysilane with Silica Gel Using Elemental Analysis and $^{29}$Si NMR Spectra." *Colloid Polym. Sci.,* vol. 275, pp. 672–680 (1997).

Yu, K.Y. et al., "Metal Ion–Imprinted Microspheres Prepared by Reorganization of the Coordinating Groups on the Surface." *Anal. Sci.,* vol. 8, pp. 701–703 (1992).

Zhang, W. et al. "Mesoporous Titanosilicate Molecular Sieves Prepared at Ambient Temperature by Electrostatic ($S^+I^-$, $S^+X^-I^+$) and Neutral ($S^\circ I^\circ$) Assembly Pathways: A Comparison of Physical Properties and Catalytic Activity for Peroxide Oxidations." *J. Am. Chem. Soc.,* vol. 118, pp. 9164–9171 (1996).

Bartsch, R.A. et al. "Molecular and Ionic Recognition with Imprinted Polymers." ACS, Washington, D.C., pp. 1–9, 49–108, 159–169, 218–237, and 314–324 (1998).

* cited by examiner

FIGURE 1A

TSPMC

TSPBC

TSPGC

BSAPTS2

BTMSPTS

BAAPTS

BSAPTS1

ORDERED MESOPORES COATED
WITH THE SURFACE IMPRINTING METHOD

ORDERED MESOPORES COATED
WITH THE CONVENTIONAL METHOD

FIG_4

IMPRINT-COATING SYNTHESIS OF SELECTIVE FUNCTIONALIZED ORDERED MESOPOROUS SORBENTS FOR SEPARATION AND SENSORS

STATEMENT OF GOVERNMENT RIGHTS

This invention was made with government support under contract No. DE-AC05-96OR22464 awarded by the U.S. Department of Energy to Lockheed Martin Energy Research Corp., and the government has certain rights in this invention.

FIELD OF THE INVENTION

The present invention relates to molecular imprint coating techniques. More particularly, the invention relates to the use of molecular imprint coating techniques for the synthesis of mesoporous sorbents and the use of such sorbents for adsorption, separation, and sensing of molecules.

BACKGROUND

One of the major problems facing industries such as mining, precious metals, and energy (e.g., coal mining and coal-fired power plants) is removal of toxic metal ions from process effluents. Stringent standards for the maximum level of pollutants in water that is funneled into domestic and ground water systems are being promulgated by federal and state agencies. Thus, there is a need in the art for simple and effective methods for the removal of such metals from process effluents.

Polymerization of metal alkoxides in the presence of molecular assemblies of surfactants or related substances, acting as structure directors, has resulted in several novel classes of mesoporous and macroporous inorganic materials with extremely high surface areas and ordered mesostructure. The mechanism for the organization of such mesostructure involves electrostatic interactions and charge matching between micellar assemblies of quaternary ammonium cations and anionic silicate oligomer species. These materials have now found extensive applications as catalyst supports and chromatographic resins.

Many applications of mesoporous materials require functionalization of the material's silanol surfaces. Presently, extensive research is being conducted to develop procedures to introduce functional silane ligands into the surfaces of the ordered mesoporous materials Feng et. al. (Science: 276, 923–926; 1997) and Mercier and Pinnavaia (Advanced Materials: 9, 500–503; 1997) have developed new, effective mesoporous sorbents for the removal of toxic metal ions based on mesoporous materials as supports. Their methodology involves coating surfaces of hexagonally packed mesoporous silica with organic functional groups to enhance their affinities for metal ions. High capacities and fast kinetics have been observed for these new sorbents. The selectivity of these materials relies solely on the affinity of the surface-coated functional ligand for a specific metal ion, with no consideration of the stereochemical interactions between the ligand and the metal ion. Thus, there is a need in the art for mesoporous sorbents having stereochemical specificity.

Bulk molecular imprinting methods based on the template approach have been used in crosslinked polymers, as well as in silica gels, to prepare polymeric supports possessing solid-state organized structures. Imprinting processes generally involve three steps: (1) selection of a target molecule as a template; (2) incorporation of the template into rigid solid networks through in situ copolymerization; and (3) removal of the template, leaving cavities with a predetermined number and arrangement of ligands that later "recognize" or selectively rebind the template or target molecule. These imprinted organic polymers have been used to resolve racemates and separate mixtures of metal cations. One major drawback associated with this bulk molecular imprinting technique is that the kinetics of the sorption-desorption process are unfavorable, as the template and ligand are totally embedded in the bulk polymer matrices and the mass transfer must take place through nonpolar, microporous channels. Furthermore, molecular imprinting studies have thus far all been conducted in disordered polymers or amorphous sol-gel matrices where the inhomogeneity of the cavities produced by the molecular imprinting reduces the selectivity of the final imprinted materials. Thus, there is a need for a bulk molecular imprinting technique that provides favorable sorption-desorption kinetics.

The generally accepted mechanism for such direct coating methods involves the initial hydrolysis of siloxane groups in the functional silane ligand followed by condensation with the surface silanol groups to produce ligands that are covalently bound or "tethered" to the surfaces. Drawbacks associated with this coating method are the time-consuming reflux syntheses and low loading of the functional silane ligands. Thus, a simpler and more efficient method for imprint coating is needed.

SUMMARY OF THE INVENTION

The present invention relates generally to mesoporous sorbent materials having high capacity, high selectivity, fast kinetics, and molecular recognition capability. The sorbent materials of the present invention exhibit significantly greater target ion binding selectivities than sorbents prepared by conventional coating methods. These sorbent materials are built upon the unique environments of ordered, hexagonally-packed mesopore surfaces and provide superior performance when compared to conventional sorbents. The mesoporous substrates of the invention exhibit many beneficial properties. These properties include circularly curved, extremely rigid pore surfaces, with optimum pore diameters of 20 Å to 500 Å that match the stereochemical requirements for surface imprinting of four or six coordinated metal ions, and a very uniform pore size distribution, which allows the generation of the uniform imprints and limits the possible choices of coordination environments.

The present invention also relates to a process for preparing these mesoporous substrates through molecular imprinting techniques. Surface imprinting was conducted in cylindrical concave surfaces, thereby successfully organizing ligand functional groups according to the sizes of the template. In general, the present process is different from conventional processes in that a template molecule is bound to one end of more than one bifunctional ligand to form a complex. This is the template binding end of the bifunctional ligand. This complex is then bound to the substrate through the free functional group of the bifunctional ligands. This is the substrate binding end of the bifunctional ligand. The template molecule is then removed from the sorbent creating ligand imprints. This coating methodology allows precise control of the stereochemical arrangement of ligands on the surfaces of mesopores, which in turn optimizes the binding of the targeted template molecule, such as a metal ion, through the creation of a tailored binding site which reflects both the size and stereochemical signature of the template molecule. This structure leads to template molecule recognition and subsequent selective binding of the template molecule from mixtures containing the template molecule.

The present invention also relates to methods of using the mesoporous sorbent materials. These uses include, but are not limited to the following: separation of toxic metals from process effluents, paints, and other samples; selective separation of specific ions from industrial process streams; removal of heavy metals from acid mine drainage, electroplating, wastewater, and municipal landfill leachate; detection of target molecules, such as ions, amino acids, drugs, herbicides, fertilizers, and trinitrotoluene (TNT) in samples; separation and/or detection of substances using chromatography; separation of enantiomeric mixtures of chemicals, such as pharmaceuticals; imaging agents; sensors; coatings; and composites. Thus, the sorbent materials of the present invention are useful in such industries as the airline, automotive, waste water management, recycling, mining, nuclear, pharmaceutical, chemical, and biological industries.

Therefore, it is an object of the present invention to provide mesoporous sorbent materials having improved stereochemical specificity.

Another object of the present invention is to provide mesoporous sorbent materials exhibiting high selectivity for a specific target molecule so that these materials may selectively remove a specific target molecule from a complex mixture or solution of different molecules.

It is another object of the present invention to provide mesoporous sorbent materials having improved kinetics.

It is yet another object of the invention to provide mesoporous sorbent materials having a high sorption capacity.

Further, it is an object of the invention to provide a simple and efficient process for the preparation of mesoporous sorbent materials.

It is an object of the present invention is to provide a process for the separation of toxic metal ions from process streams.

It is another object of the present invention to provide a chromatographic method employing a mesoporous sorbent material.

DETAILED DESCRIPTION OF THE INVENTION

Definitions

The substrate of the present invention may be any mesoporous material that is highly ordered and porous. Such substrates include, but are not limited to, metal alkoxides, such as silicon dioxide ($SiO_2$), titanium dioxide ($TiO_2$), zirconium dioxide ($ZrO_2$), and tin oxide ($SnO_2$).

The terms "target molecule" and "template molecule" are used synonymously in the present application and refer to the metal ion or organic molecule to be captured or absorbed by the mesoporous sorbent. Practically any metal ion may be used in the present invention. Metal ions, or substances which dissociate to form metal ions, which are useful in the present invention include, but are not limited to, $Ag^+$, $Al^{3+}$, $Am^{3+}$, $As^{3+}$, $Au^+$, $Au^{3+}$, $Ba^{2+}$, $Be^{2+}$, $Bi^{3+}$, $Br^+$, $Ca^{2+}$, $Cd^{2+}$, $Ce^{3+}$, $Ce^{4+}$, $Cf^{3+}$, $CH_3Hg^+$, $Cm^{3+}$, $Co^{2+}$, $Co^{3+}$, $Co(NH_3)_6^{3+}$, $Cr^{3+}$, $Cr^{6+}$, $Cs^+$, $Cu^+$, $Cu^{2+}$, $Cu(alanine)_2^{2+}$, $Cuen_2^{2+}$, $Coen_3^{3+}$, $Dy^{3+}$, $Er^{3+}$, $Eu^{3+}$, $Fe^{2+}$, $Fe^{3+}$, $Fe(CN)_5NO^{2-}$, $Ga^{3+}$, $Gd^{3+}$, $H^+$, $Hg^{2+}$, $Hg_2^{2+}$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_2^+$, P, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $ReO_4^-$, $Rh^{3+}$, Ru, S, $Sb^{3+}$, $Sb^{5+}$, $Sc^{3+}$, Se, $Sm^{3+}$, $Sn^{2+}$, $Sr^{2+}$, $Tb^{3+}$, $TcO_4^-$, $Th^{4+}$, $Ti^{3+}$, $Tl^+$, $Tl^{3+}$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, and $Zr^{4+}$. Preferred ions include $Au^{3+}$, $Hg^{2+}$, $Sr^{2+}$, $Ni^{2+}$, $Pb^{2+}$, $UO_2^{2+}$, $Ca^{2+}$, $Mg^{2+}$, $Mn^{2+}$, $Co^{2+}$, $Cu^{2+}$, $Zn^{2+}$, $Cd^{2+}$, $Th^{4+}$, $Cr^{3+}$, $Cs^+$, $Ag^+$, $Au^+$, $Tl^+$, $TcO_4^-$, and $ReO_4^-$. Divalent metal ions are especially preferred.

Organic molecules useful in the present invention include any small molecule that is small enough to fit within the pores of the mesoporous substrate. For example, the organic molecule may be a salt, a bioactive molecule, a neurotransmitter, a carbohydrate, a sugar, an amino acid, TNT, a pharmaceutical drug, cocaine and related compounds, an herbicide, an aldehyde, a ketone, an ether, a carboxylic acid, an ester, an amine, or an amide.

Preferred amino acids for use in the present invention include, but are not limited to alanine, aminomalonic acid, anthanilic acid, arginine, asparagine, aspartate, aspartic acid, betaine, carboxyglutamate, citrulline, cysteine, cystine, diglycine, dipicolinic acid, ethionine, N-ethylglycine, glutamate, glutamic acid, glutamine, glycine, histidine, homoserine, isoleucine, isoserine, leucine, lysine, methionine, nicotinic acid, norleucine, norvaline, pencillamine, pentaglycine, phosphoserine, sarcosine, sarcosylglycine, serine, spinacine, tryptophan, tyrosine, valine and modified versions thereof.

The term "bifunctional ligand" as used in the present invention refers to any organic molecule that has a functional group at one end of the molecule which is capable of reacting with the surface of the mesoporous substrate and a functional group at the other end which can form a releasable complex with the target molecule. These are the substrate binding end of the bifunctional ligand and the template binding end of the bifunctional ligand, respectively. Functional groups which are capable of reacting with the substrate are well known in the art. These groups include, but are not limited to, amine groups, sulfhydryl groups, phosphonate groups, sulfonate groups, carboxyl groups, and silane groups. Bifunctional ligands having silane groups are preferred. Functional groups which are capable of forming a releasable complex with the target molecule include, but are not limited to, those described in *Comprehensive Coordination Chemistry* (G. Wilkenson, R. D. Gillard, and J. A. McCleverty (eds), Pergamon Press, Oxford (1987)). These functional groups include amines, thiols, carboxylic acids, sulfonic acids, and phosphonic acids.

Figure 1A:
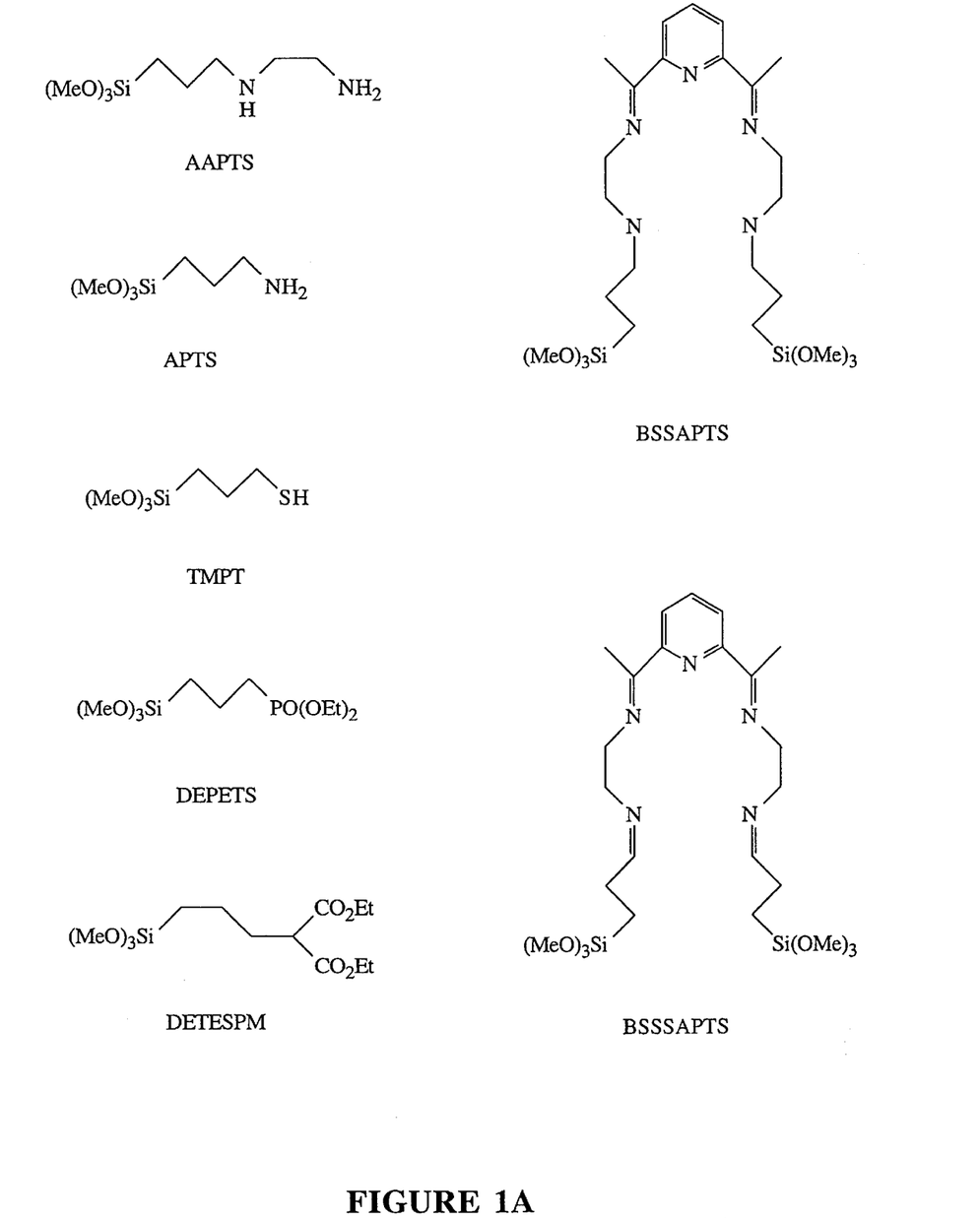
FIGS. 1A and 1B provide the structural formulas for the preferred bifunctional ligands of the invention.
Figure 1B:
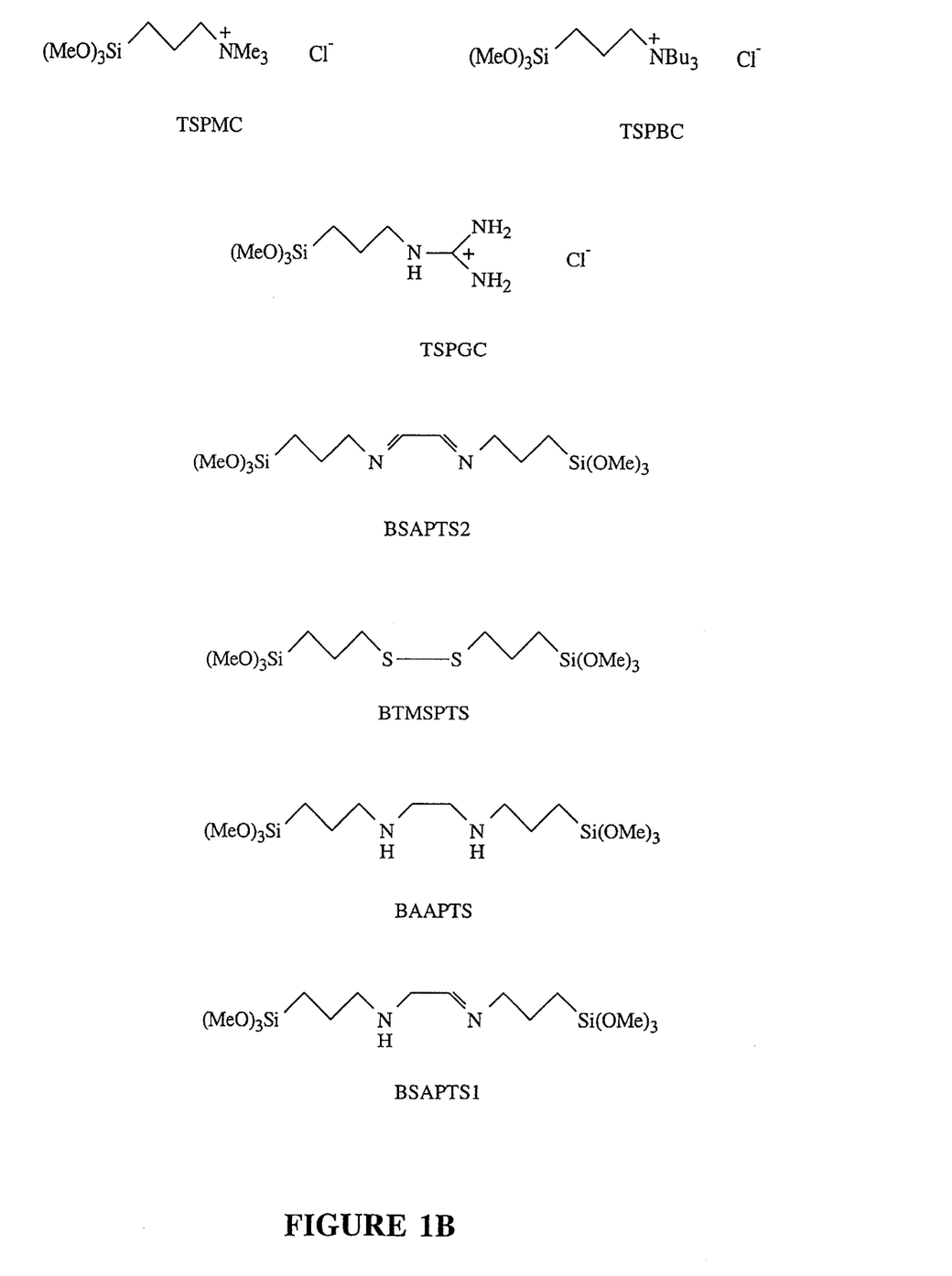

Examples of ligands which may be employed in the present invention include, but are not limited to, organic silanes and Schiff bases. Examples of organic silanes useful in the present invention include compounds such as tris (methoxy)mercaptopropylsilane and $(RO)_2P(=O)CH_2CH_2Si(OR)_3$, where R represents an alkyl group. R is preferably an alkyl group having from 1 to 5 carbon atoms. Preferred silanes useful in the present invention include 3-amniopropyltris(trimethylsiloxy)silane (APTS), N-(2-aminoethyl)-3-aminopropyltrimethoxysilane (AAPTS), bis [3-(trimethoxysilyl)propyl]ethylenediamine (BAAPTS), bis [3-(trimethoxysilyl)propyl]mono Schiff base (BSAPTS1), bis[3-(trimethoxysilyl)propyl]di Schiff base (BSAPTS2), bis[3-(trimethoxysilyl)propyl]-macroacyclic diSchiff base (BSSAPTS), bis[3-(trimethoxysilyl)propyl]macroacyclic tetra Schiff base (BSSSAPTS), bis[3-(trimethoxysilyl)propyl]-tetrasulfide (BTMSPTS), diethylphosphatoethyltrimethoxysilane (DEPETS), diethyl(trimethoxysilylpropyl) malonate (DETESPM), 3-mercaptopropyl-trimethoxysilane (TMPT), N-trimethoxysilylpropyl-N,N,N-tri-n-butyl ammonium chloride (TSPBC), N-trimethoxysilylpropyl-3-guanidine chloride (TSPGC), and N-trimethoxysilylpropyl-N,N,N-trimethyl ammonium chloride (TSPMC), whose structures are provided in FIGS. 1A and 1B.

Solvents useful in the formation of the mesoporous substrate include, but are not limited to, water and alcohols. Examples of preferred alcohols include methanol, ethanol, and propanol.

Solvents useful for the imprinting process include, but are not limited to, water and protic solvents, such as alcohols, toluene and DMSO. Examples of alcohols useful in the present invention include, but are not limited to, methanol, ethanol, and propanol.

Imprinting precursors are the coordinated complexes formed between the template molecule and the bifunctional ligands. Although not wanting to be bound by the following statement, it is believed that the imprinting precursors are formed when the bifunctional ligands, acting as Lewis bases, donate electrons to the electron deficient template molecules to form dative bonds between the ligands and the template molecules.

Composition

The present invention employs surface imprinting on ordered, cylindrical surfaces of mesopores, thereby successfully organizing ligand functional groups according to the sizes and stereochemical signatures of template ions. These sorbents are, in effect, solid-state analogues of crown ether-type ligands which can be tailored for a specific target ion. The simplicity of this technique provides a wide variety of new, highly selective mesoporous sorbents, the properties of which can be optimized for many metal ions and other molecules. The only requirement is that the target molecule form stable coordination complexes with one or more suitable bifunctional ligands containing a functional group that reacts with functional groups on the surface of the mesoporous substrate. This surface imprinting methodology is not limited to the binding of metal ions, but encompasses complexes formed between targeted organic molecules and bifunctional ligands that can attach to the surface of the mesoporous substrate.

The ordered mesoporous sorbents of the present invention comprise a bifunctional ligand bound to a mesoporous substrate. The bifunctional ligand of the present invention may be any organic molecule that has a functional group on one end that can form a coordinated complex with a target molecule, the template binding end, and has a functional group on the other end of the molecule that will react with functional groups on the surface of the mesoporous substrate to bind the coordinated complex to the surface of the substrate, the substrate binding end. Preferred bifunctional ligands of the present invention are defined above.

The ordered mesoporous substrate of the invention is composed of a substance such as silica, titanium, or zirconium that has a very uniform pore size distribution. The substrate may have surface areas of over 1000 m²/g. The substrate comprises ordered, hexagonally packed pores on its surface. These pores have mesopore volumes of up to 1.2 cc/g, with a pore volume of greater than 0.8 cc/g cc/g being preferred. The pores provide uniform, cylindrical, concave surfaces for attaching the coordinated (complexed) template molecules. The number of possible choices of coordination environments for organization of the ligand functional groups is limited by the diameter of the pores. This limited number of coordination environments allows for optimal organization of ligand functional groups according to the sizes of pores in the template. Preferred diameters of the pores are between approximately 20 Å and 500 Å.

The structural arrangement of the substrate allows for the optimal binding of coordinated template molecules in the pores of the substrate. The optimal arrangement is for the template molecule to be bound via four or six coordination bonds inside the mesopores. Binding of these optimum numbers of coordinated template molecules provides tailored binding pockets that are created by removal of the template molecule from the bound bifunctional ligand complexes. When the sorbents are later contacted with the target molecule, the target molecule binds to the target binding ends of the bifunctional ligands in the binding pocket. The unique rigid structure of the binding pockets allows for stereochemical specificity of the binding between the target molecule and the target binding end of the bifunctional ligand. These stereochemical interactions provide faster adsorption kinetics than those of conventionally coated mesoporous sorbents. Adsorption equilibria for the sorbents of the invention are generally reached in less than 15 minutes, while conventional sorbents may not equilibrate for hours. In addition to faster kinetics, the ordered mesoporous sorbents of the present invention exhibit higher capacities and higher selectivities than conventional sorbents. Moreover, their capacity does not change after repeated cycles of loading and elution.

Uses

The sorbents of the present invention are useful for the detection, quantification, and removal of target molecules from solutions. Metal ions can be used as template molecules for the development of sorbents that can be used in many different industries. Examples of such metals include, but are not limited to, $Ag^+$, $Al^{3+}$, $Am^{3+}$, $As^{3+}$, $Au^+$, $Au^{3+}$, $Ba^{2+}$, $Be^{2+}$, $Bi^{3+}$, $Br^+$, $Ca^{2+}$, $Cd^{2+}$, $Ce^{3+}$, $Ce^{4+}$, $Cf^{3+}$, $CH_3Hg^+$, $Cm^{3+}$, $Co^{2+}$, $Co^{3+}$, $Co(NH_3)_6^{3+}$, $Cr^{3+}$, $Cr^{6+}$, $Cs^+$, $Cu^+$, $Cu^{2+}$, $Cu(alanine)_2^{2+}$, $Cuen_2^{2+}$, $Coen_3^{3+}$, $Dy^{3+}$, $Er^{3+}$, $Eu^{3+}$, $Fe^{2+}$, $Fe^{3+}$, $Fe(CN)_5NO^{2-}$, $Ga^{3+}$, $Gd^{3+}$, $H^+$, $Hg^{2+}$, $Hg_2^{2+}$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_2^+$, P, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $ReO_4^-$, $Rh^{3+}$, Ru, S, $Sb^{3+}$, $Sb^{5+}$, $Sc^{3+}$, Se, $Sm^{3+}$, $Sn^{2+}$, $Sr^{2+}$, $Tb^{3+}$, $TcO_4^+$, $Th^{4+}$, $Ti^{3+}$, $Tl^+$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, and $Zr^{4+}$.

One such use is the removal of toxic metals from waste streams, such as waste water streams or organic waste streams, produced by industrial processes. The metals are removed from the stream by contacting the stream with the sorbent. The target binding ends of the bifunctional ligands bind selectively to the metal ions, removing them from the stream. The process may be a batch process in which the sorbent is added to a tank or container of the water. Alternatively, the sorbent may be placed in the waste water stream to remove the metals. Multiple metals may be removed by placing sorbents tailored for different metals in a series along the effluent stream, for example, by placing one or more of the sorbents of the invention in filter cartridges. The present process provides an efficient method for the removal of the metal ions due to the specificity provided by the tailored binding pockets of sorbents.

Another such use is the removal of metals, such as silver, gold, and molybdenum, from fluids and mining effluents. Yet another such use is the removal of silver and other metals from photographic wastes produced during the development of photographs or manufacture of photographic emulsions and paper coated with photographic emulsions. A further use of the sorbents of the present invention is the removal of lead and other metals from paint. The sorbents of the present invention can also be used in the recycling of important metals such as silver, gold, mangangese, molybdenum, titanium, and lead.

The sorbents of the present invention can also be used to detect chemical and biological molecules in air and fluid samples. For example, explosive compounds, such as TNT, and drugs, such as cocaine, may be used as the template ion to develop sorbents in accordance with the present invention. The imprint-coated sorbents can be coated on a quartz microbalance, surface acoustic wave (SAW) devices, or cantilever devices. The change in weight of the template due to the adsorption of the target molecule is then monitored. Due to the high capacity and high selectivity of these sorbents, it is possible to detect even low levels of TNT and drugs in an air sample. Therefore, the sorbents of the present invention are useful in laboratories and forensic laboratories, industrial and occupational safety apparatus, and for security purposes in airports, shipping, and other areas where monitoring of drugs and explosives is desirable.

The sorbents of the present invention may be used to detect and remove potentially harmful chemicals from samples. For example, the sorbents may be used to detect the presence of herbicides, insecticides, or fertilizers on plants or in ground and surface water. They may also be used to detect explosives and toxic metal ions. Again, the chemical to be detected is used as the template molecule in the production of the sorbent. The sample, suspected of containing the chemical, is contacted with the sorbent, allowing for the capture and detection of the chemical.

Detection of chemicals, metal ions, and other target molecules may be performed by any conventional method in the art. Examples of such detection methods include, but are not limited to, spectrophotometry, radiation detection, scintillation, light radiation, fluorescence, mass spectrophotometry, gas chromatography, and absorbance. Determination of the appropriate method for detecting the bound target molecule is within the level of skill of the ordinary artisan. Alternatively, the target molecule may be eluted from the sorbent with an acid and detected in solution by convention methods such as those described above.

Further, the sorbents may also be used to concentrate harmful chemicals in laboratory wastes. The sorbents can also be used for degreasing and for the capture of metals in the automotive industry.

Similarly, the sorbents of the present invention may be used for the detection and quantification of biological molecules in a biological fluid or an extract or homogenate of cells or tissues. Such substances include, but are not limited to, neurotransmitters, such as acetylcholine, indoleamines, catecholamines, excitatory and inhibitory amino acids, cytokines, ionophores, ion channel agonists and antagonists, monokines, small hormones, including steroid hormones, electrolytes, glucose and amino acids, such as alanine, aminomalonic acid, anthanilic acid, arginine, asparagine, aspartate, aspartic acid, betaine, carboxyglutamate, citrulline, cysteine, cystine, diglycine, dipicolinic acid, ethionine, N-ethylglycine, glutamate, glutamic acid, glutamine, glycine, histidine, homoserine, isoleucine, isoserine, leucine, lysine, methionine, nicotinic acid, norleucine, norvaline, pencillamine, pentaglycine, phosphoserine, sarcosine, sarcosylglycine, serine, spinacine, tryptophan, tyrosine, valine and modified versions thereof.

Measurement of such biological molecules can be used for medical diagnosis, monitoring, treatment, and other medical applications.

The sorbents of the present invention may also be incorporated into chromotagraphy columns and precolumns, including affinity columns, for the detection, quantification, and/or removal of molecules. For example, the sorbent can be used as a chromatographic resin. The chromatography column is packed with the sorbent. A solution containing the target molecule is passed through the column which adsorbs the target molecule species, but allows other species in the solution to pass through the column, resulting in the chromatographic separation of the target molecule from the other components in the solution. Additionally, the sorbents of the present invention may be used in conjunction with radio-contrast agents and dyes in various imaging applications. The sorbents may be used to sequester excess or spent dyes. The sorbents may also be used for the adsorption and ultimate recovery of silver from waste streams.

Process

The invention also relates to a process for preparing the ordered mesoporous sorbents of the invention through molecular imprinting techniques. Surface imprinting was conducted on the cylindrical concave surfaces of the pores of the substrate, thereby successfully organizing ligand functional groups according to the sizes of the template.

Process for Preparing the Imprint-coated Ordered Mesoporous Sorbent of the Invention In general, the imprint-coated, ordered mesoporous sorbent is prepared by mixing an imprint coating precursor and an ordered mesoporous substrate. The imprint coating precursor is a coordinated complex comprising a template molecule and bifunctional ligands. The substrate binding end of the bifunctional ligands bind to the surface of the substrate to form a coated mesoporous substrate. The coated mesoporous substrate is then treated with acid to remove the template molecule, leaving tailored binding pockets between the target binding ends of the bifunctional ligands. The coated sorbent is then optionally dried, for example, by evaporation. The sorbent is then titrated to a near neutral pH to form the final sorbent.

The imprint coating precursor is prepared by dissolving the template molecule in a solvent. Any solvent in which the imprint coating precursor is soluble may be used in the process. Preferred solvents include, but are not limited to, water, toluene, DMSO and protic solvents. A bifunctional ligand, as defined above, is then added to the solution, which is agitated for a few minutes. Agitation may be provided by any means, for example, stirring, shaking, or sonication. Optimal time limits for reaction of the template molecule and bifunctional ligand depend on the thermodynamics and kinetics of the binding reaction and are within the level of skill of the ordinary artisan. While not wanting to be bound by the following statements, it is believed that the template molecule and the bifunctional ligand form a coordinated complex through dative bonding. These bonds hold the complex together in a releasable manner that provides for later release of the template molecule.

Once the imprint coating precursor is formed, the ordered mesoporous substrate is added to the solution which is agitated for several minutes to several hours. Optimal reaction times are dependent upon the rate of hydrolysis of the imprint coating precursor. Determination of optimal reaction times is within the level of skill of the ordinary artisan. The substrate binding end of the bifunctional ligands binds to the substrate, forming an imprint coated mesoporous substrate. The coated substrate is then optionally dried, for example, by evaporation or vacuum drying.

Next, the imprint coated substrate is thoroughly washed with copious amounts of an acid to remove all of the template molecule and excess unbound bifunctional ligand. The specific acid, amount of acid, and length of treatment will depend upon the pH necessary to remove the template molecule from the imprinted sorbent, which in turn depends upon the specific template molecule and specific bifunctional ligand employed in the process. For example, amines are protonated below a pH of 3 and lose their ability to complex metal cations. Therefore, when a metal ion is used as the template molecule and a bifunctional ligand containing an amine functional group is used to complex the metal ion, the specific acid will be chosen to create a pH of 3 or less. When the template molecule is a metal ion, preferred acids include mineral acids, such as nitric acid, hydrochloric acid, and sulfuric acid. The concentration of the acid used is preferably between 0.1M and 3M. The most preferred acid for stripping the template molecule is 1M nitric acid.

The resulting mesoporous sorbent is added to deionized water and titrated with a base, such as sodium hydroxide or ammonium hydroxide, to a near neutral pH. The preferred pH range of the neutralized sorbent is between pH 7 and pH 8, with a pH of 7.5 being most preferred. The resulting product is then filtered and washed with deionized water. The product is then placed in a vacuum oven at a temperature between about 70° C. and about 100° C. for about 2 hours to about 4 hours.

The template molecule is the target molecule that the sorbent is designed to absorb. The specific ligand employed in the process depends upon the template molecule. Choice of a ligand is within the skill level of the ordinary artisan. The following are examples of preferred ligands useful in the present invention and the preferred template molecule which may be used with these ligands. The following description simply presents preferred embodiments of the present invention and are not intended to be limiting. The following ligands may each be used for the development of sorbents for $Cu^{2+}$, $UO_2^{2+}$, $Hg^{2+}$, $Ni^{2+}$, and $Zn^{2+}$: APTS, AAPTS, BAAPTS, BSAPTS, BSSAPTS, and BSSSAPTS. APTS may also be used to develop sorbents for $Ag^+$, while BSAPTS, BSSAPTS, and BSSSAPTS may also be used to develop sorbents for $Sr^{2+}$. The following ligands may be used for the development of mesoporous sorbents for $Hg^{2+}$: BTMSPTS, DEPETS, DETESPM, and TMPT. DEPETS and DETESPM can also be used to develop sorbents for $UO_2^{2+}$, and DETESPM can be used to develop sorbents for $Cu^{2+}$. TSPBC, TSPGC, and TSPMC may be used for the development of mesoporous sorbents for $TcO_4^-$ and $ReO_4^-$.

Preferred functional groups on bifunctional ligands for the development of imprint coating precursors are amines, thiols, carboxylic acids, sulfonic acids, and phosphonic acids. The following are examples of metal template molecules which may be used with each of these preferred functional groups when forming a mesoporous sorbent specific for the metal ion.

Amines: $Ag^+$, $Au^+$, $Au^{3+}$, $Ca^{2+}$, $Cd^{2+}$, $CH_3Hg^+$, $Co^{2+}$, $Co^{3+}$, $Cr^{3+}$, $Cu^+$, $Cu^{2+}$, $Fe^{2+}$, $Fe^{3+}$, $H^+$, $Hg^{2+}$, $K^+$, $Li^+$, $Mg^{2+}$, $Mn^{2+}$, $Na^+$, $Ni^{2+}$, $Pt^{2+}$, Ru, $Sc^{3+}$, $Tl^+$, $Tl^{3+}$, $UO_2^{2+}$, and $Zn^{2+}$.

Thiols: $Ag^+$, $As^{3+}$, $Au^+$, $Bi^{3+}$, $Br^+$, $Cd^{2+}$, $Ce^{3+}$, $Co^{2+}$, $Cu^+$, $Cu^{2+}$, $Fe^{2+}$, $Fe(CN)_5NO^{2-}$, $H^+$, $Hg^{2+}$, $Hg_2^{2+}$, $In^{3+}$, $La^{3+}$, $Mn^{2+}$, $Mo^{6+}$, $Ni^{2+}$, P, $Pb^{2+}$, $Po^{2+}$, $Re^{7+}$, S, $Sb^{3+}$, $Sb^{5+}$, $Sn^{2+}$, $Tl^+$, $V^{5+}$, $W^{6+}$, and $Zn^{2+}$.

Carboxylic acids: $Ag^+$, $Al^{3+}$, $Am^{3+}$, $Ba^{2+}$, $Bi^{3+}$, $Ca^{2+}$, $Cd^{2+}$, $Ce^{3+}$, $Cf^{3+}$, $Cm^{3+}$, $Co^{2+}$, $Cu^{2+}$, $Dy^{3+}$, $Er^{3+}$, $Eu^{3+}$, $Fe^{2+}$, $Fe^{3+}$, $Ga^{3+}$, $Gd^{3+}$, $H^+$, $Hg^{2+}$, $Ho^{3+}$, $In^{3+}$, $La^{3+}$, $Li^+$, $Lu^{3+}$, $Mg^{2+}$, $Mn^{2+}$, $Mo^{5+}$, $Na^+$, $Nd^{3+}$, $Ni^{2+}$, $Pb^{2+}$, $Pd^{2+}$, $Pr^{3+}$, $Pu^{3+}$, $Pu^{6+}$, $Sc^{3+}$, $Sm^{3+}$, $Sr^{2+}$, $Tb^{3+}$, $Th^{4+}$, $Ti^{3+}$, $Tl^{3+}$, $Tm^{3+}$, $U^{4+}$, $V^{2+}$, $VO^{2+}$, $V^{5+}$, $Y^{3+}$, $Yb^{3+}$, $Zn^{2+}$, and $Zr^{4+}$.

Sulfonic acids: $Ag^+$, $Ca^{2+}$, $Cd^{2+}$, $Ce^{3+}$, $Co(NH_3)_6^{3+}$, $Cr^{3+}$, $Cu^+$, $Cu(alanine)_2^{2+}$, $Cuen_2^{2+}$, $Coen_3^{3+}$, $Fe^{3+}$, $H^+$, $Hg^{2+}$, $Ir^{3+}$, $Pd^{2+}$, $Pt^{2+}$, $Pu^{4+}$, $Rh^{3+}$, Se, $Th^{4+}$, $Tl^{3+}$, $U^{4+}$, and $UO_2^{2-}$.

Phosphonic acids: $Ag^+$, $Al^{3+}$, $Ba^{2+}$, $Be^{2+}$, $Bi^{3+}$, $Ca^{2+}$, $Cd^{2+}$, $Ce^{3+}$, $Ce^{4+}$, $Co^{2+}$, $Co(NH_3)_6^{3+}$, $Cr^{3+}$, $Cr^{6+}$, $Cu^{2+}$, $D^+$, $Fe^{3+}$, $H^+$, $Hg_2^{2+}$, $In^{3+}$, $Ir^{4+}$, $K^+$, $La^{3+}$, $Li^+$, $Mg^{2+}$, $Mn^{2+}$, $Mo^{4+}$, $Mo^{6+}$, $Na^+$, $Nb^{5+}$, $Ni^{2+}$, $Np^{4+}$, $NpO_2^+$, $pb^{2+}$, $Pu^{4+}$, $Sc^{3+}$, $Sr^{2+}$, $Th^{4+}$, $Ti^{3+}$, $U^{4+}$, $UO_2^{2+}$, $VO^{2+}$, $Zn^{2+}$, and $Zr^{4+}$.

As can be seen from the following description, the process of the present invention differs from conventional process for the formation of mesoporous sorbents. Convention processes, like those described by Mallouk and Gavin (Acc. Chem. Res.: 31, 209–217; 1998) use an ion-exchange reaction to prepare intercalate materials. The general reaction mechanism can be expressed as follows:

$$m(\text{S—O}^-)\ M_1^+ + M_2^{m+} = (\text{S—O}^-)_m M_2^{m+} + m M_1^+ \tag{1}$$

where (S—O$^-$) is a surface anionic group in inorganic materials such as the galleries of pillared materials; $M_1^+$ is a singly charged cation in as-synthesized materials; and $M_2^{m+}$ is a new cationic species needing to be intercalated into the above materials. Ordered mesoporous materials synthesized by the use of cationic surfactants have the same structural feature as those of ionic intercalate materials. In this case, the (S—O$^-$) groups correspond to the SiO$^-$ anions on the mesopore surface, while $M_1^+$ is a cationic surfactant ion. The cationic surfactant ions are organized in the form of a cylindrical micellar structure with hydrophilic positive ends coulombicly interacting with silica pore surfaces. The weak coulombic interaction can be easily broken or replaced by another cation through ion exchange (eq. 1). An important property of coating complexes, such as $Cu(AAPTS)_2^{2+}$, in the surface imprint coating is the charge on the complex.

The present inventors determined that such positively charged complexes could efficiently replace the positively charged surfactant molecules through ion-exchange reactions similar to those described above. The complexes exchanged into the mesopores can then be covalently attached to the mesoporous surfaces through condensation reactions of silicon alkoxide groups in the bifunctional ligands with neighboring surface SiO$^-$ or —SiOH groups. This results in a more efficient functionalization of the pore surface. While not wanting to be bound by the following statements, it is believed that the reaction mechanism can be formulated as shown in equations 2 and 3 below which depict the ion exchange reaction, which forms the imprint coating precursor and the condensation reaction, which attaches the imprint coating precursor to the mesoporous substrate, respectively.

Ion-Exchange Reaction $$\{\text{Si—O}^-, 2\text{S}^+\} + [M(AAPTS)_2]^{2+} = \{\text{Si—O}^-, [M(AAPTS)_2]^{2+}\} + 2\text{S}^+ \tag{2}$$

where S$^+$ = a cationic surfactant ion

Condensation Reaction $$\{\text{Si—O}^-, [M(aapts)_2]^{2+}\} = \{\text{Si—O—}[M(aapts)_2]^{2+}\} \tag{3}$$

The metal ion can be removed from surface complexes via fast protonation reactions or solvent extractions. Therefore, functionalized mesoporous materials are obtained. Here, the positively-charged metal ion works as an efficient carrier to deliver the bifunctional ligand molecules in this proposed surface functionalization methodology. These ion-exchange reactions are usually kinetically fast and thermodynamically favored. Accordingly, this new method results in more efficient surface functionalization. More importantly, the amount of bifunctional ligands deposited on the mesopore surfaces should be increased.

This methodology can be used to coat any neutral bifunctional ligands with the chosen metal ion template. It can also be used to coat such bifunctional ligands with template molecules other than metal ions.

In addition to the formation of imprinted mesoporous material through the imprint coating of a single template molecule, a multilevel imprinting methodology can be used to synthesize functionalized mesoporous materials that exhibit a high selectivity for specific target molecules. For example, a metal complex is formed with ligands which contain an alkoxysilane group and added to a sol gel precursor in the presence of a surfactant. Hydrolysis and condensation reactions result in the direct covalent bonding of the ligands to the mesoporous matrix. Both the metal ions and the surfactant micelles act as templates in this system. The removal of the target molecules and surfactant micelles leaves different sized imprints, each with its own function. The surfactant forms cylindrical mesopores, which give the sorbents large surface areas and excellent transport kinetics. Removal of the template molecules results in the formation of micropores, which give the material enhanced selectivity for the specific target molecule. The template molecule may be, for example, a metal ion or a molecular compound. Sorbents can be synthesized by this process with cationic, anionic, and neutral surfactants, and even with latex beads.

Process for Preparing the Mesoporous Substrate of the Invention

The ordered mesoporous substrates of the present invention can be prepared by a surfactant assembly pathway that involves hydrogen-bonding or coulambic interactions between a surfactant and inorganic precursors. The key to this methodology lies in the use of surfactants to assemble the inorganic precursors in solution during the sol-gel process. Calcined, ordered mesoporous silica samples prepared via this procedure have surface areas over 1100 $m^2/g$ and average pore sizes of about 24 Å to about 60 Å.

In general, the mesoporous substrate of the present invention is prepared by mixing an ammonium halide, water and a base. The molar ratio of these reactants is approximately 0.12:130:0.7. Preferred ammonium halides include cetyltrimethylammonium bromide (CTAB) and cetyltrimethylammonium chloride (CTAC), while preferred bases include sodium hydroxide, ammonium hydroxide, lithium hydroxide, potassium hydroxide, calcium hydroxide, and magnesium hydroxide. A silicate, titanate, or zirconate is then added to the mixture at room temperature. Preferred silicates include tetraethylorthosilicate (TEOS), tetramethylorthosilicate (TMOS), and tetrabutylorthosilicate (TBOS); preferred titanates include tetraethylorthotitanate, tetra-tert-butylorthotitanate, tetraisopropylorthotitanate, tetrabutylorthotitanate, tetrapropylorthotitanate; and preferred zirconates include tetrapropylzirconate, zirconium (IV) tert-butoxide, zirconium (IV) butoxide, zirconium (IV) isopropoxide. The mixture is then heated to temperatures in the range of about 60° C. to about 80° C. for a period of about 14 to about 20 hours. The solid product formed is the recovered by filtration.

In one embodiment of the invention, the mesoporous substrate is prepared by mixing CTAB, water, and NaOH in a CTAB:$H_2O$:NaOH molar ratio of 0.12:130:0.7. To this solution, TEOS is added at room temperature. The mixture is then heated at 1000° C. for 24 hours. The solid product is then recovered by filtration.

It will be appreciated that other embodiments and uses will be apparent to those skilled in the art and that the invention is not limited to the specific illustrative examples provided below.

EXAMPLE 1

Preparation of the Copper-imprinted Substrate in MeOH

Cu($NO_3$)$_2$·$3H_2O$ (0.567 g) was added to 50 ml MeOH and stirred. Once the Cu($NO_3$)$_2$·$3H_2O$ was completely dissolved in the methanol, AAPTS (1.02 mole) was added to the solution. The mixture was then stirred for one hour, followed by the addition of mesoporous silica (0.25 g). The solution was stirred and evaporated to dryness. This residue was then washed with copious amounts of 1M $HNO_3$ to remove all of the copper and any excess AAPTS. The resulting gel was placed in deionized water and titrated to a pH of 7.5 with 2M NaOH. The product was then filtered, washed with deionized water, and placed under vacuum at 800° C. for four hours.

The control blank samples were prepared using the procedure described above without the addition of Cu($NO_3$)$_2$·$3H_2O$.

EXAMPLE 2

Preparation of the Copper-imprinted Substrate in $H_2O$

Cu($NO_3$)$_2$·$3H_2O$ (0.567 g) was added to 50 ml water and stirred. Once the Cu($NO_3$)$_2$·$3H_2O$ was completely dissolved in the water, AAPTS (1.02 mole) was added to the solution. The mixture was then stirred for one hour, followed by the addition of mesoporous silica (0.25 g). The solution was stirred and evaporated to dryness. This residue was then washed with copious amounts of 1M $HNO_3$ to remove all of the copper and any excess AAPTS. The resulting gel was placed in deionized water and titrated to a pH of 7.5 with 2M NaOH. The product was then filtered, washed with deionized water, and placed under vacuum at 800° C. for 4 hours.

EXAMPLE 3

Preparation of the Mercury (II)-imprinted Substrate in $H_2O$ $Hg(NO_3)_2$ (0.005 mole) was added to 50 ml water and stirred. Once the $Hg(NO_3)_2$ was completely dissolved in water, AAPTS (0.01 mole) was added to the solution. The mixture was then stirred for 30 minutes, followed by addition of mesoporous silica (2 g). The solution was stirred for 4 hours and filtered. This residue was then washed with copious amounts of 1M $HNO_3$ to remove all of the mercury and any excess AAPTS. The resulting gel was placed in deionized water and titrated to a pH of 7.5 with 2M NaOH. The product was then filtered, washed with deionized water, and placed under vacuum at 80° C. for four hours.

EXAMPLE 4

Preparation of the Uranyl-imprinted Substrate in $H_2O$ $UO_2(NO_3)_2 \cdot 6H_2O$ (0.01 mole) was added to 50 ml water and stirred. Once the $UO_2(NO_3)_2 \cdot 6H_2O$ was completely dissolved in water, AAPTS (0.02 mole) was added to the solution. The mixture was then stirred for 30 minutes, followed by addition of mesoporous silica (2 g). The solution was stirred for 2 hours and filtered. This residue was then washed with copious amounts of 1M $HNO_3$ to remove all of the uranyl and any excess AAPTS. The resulting gel was placed in deionized water and titrated to a pH of 7.5 with 2M NaOH. The product was then filtered, washed with deionized water, and placed under vacuum at 80° C. for 4 hours.

EXAMPLE 5

Preparation of the Uranyl-imprinted Substrate in DMSO $UO_2(NO_3)_2 \cdot 6H_2O$ (0.01 mole) was added to 50 ml DMSO and stirred. Once the $UO_2(NO_3)_2 \cdot 6H_2O$ was completely dissolved in DMSO, AAPTS (0.02 mole) was added to the solution. The mixture was then stirred for 30 minutes, followed by addition of mesoporous silica (2 g). The solution was stirred for 2 hours and filtered. This residue was then washed with copious amounts of 1M $HNO_3$ to remove all of the uranate and any excess AAPTS. The resulting gel was placed in deionized water and titrated to a pH of 7.5 with 2M NaOH. The product was then filtered, washed with deionized water, and placed under vacuum at 80° C. for 4 hours.

Properties of the Sorbents

In order to illustrate the potential of the imprinting methodology of the present invention, $Cu^{2+}$-selective, ordered mesoporous sorbents were chosen to demonstrate both the basic principles of the concept and the method for preparing the sorbent materials.

The two imprinting precursors used in this study are $Cu(APTS)_xS_{6-x}^{2+}$ and $Cu(AAPTS)_2S_2^{2+}$ [x=3–5; S= solvent ($H_2O$ or methanol)], which were synthesized by the process of the invention as described in Examples 1–2. Based on molecular mechanics modeling, the sizes of the most probable conformations for these two complexes are in the range of 16–25 Å, which are ideal to fit into mesoporous substrates with pore diameters of 25 Å.

EXAMPLE 6

Capacity of $Cu^{2+}$-selective Sorbents

The capacities of the sorbents of the present invention were investigated using silica-based $Cu^{2+}$-selective sorbents having APTS and AAPTS as the bifunctional ligands. These sorbents were compared to control sorbents that were produced in the absence of the template molecule. $^{29}Si$ MAS solid state NMR spectra of the sorbents of the present invention and of the corresponding control blanks gave two groups of peaks. The peaks around 65 ppm are attributable to the silicon atoms tethered to amino groups on surfaces, and the peaks around −110 ppm are due to silicon atoms derived from the original support. Based on the relative areas of the envelopes for these two groups of peaks, the loadings of the bifunctional ligands APTS and AAPTS are estimated to be about 0.92 mmol/g and about 0.40 mmol/g, respectively. This estimation is consistent with the elemental ICP-AE (inductively coupled plasma atomic emission spectroscopy) analysis of the solutions after HF digestion of the coated sorbents. In HF digestion, 48% hydrofluoric acid was added to the sorbent, causing the sorbent to dissolve. The resulting solution was then analyzed via a Perkin Elmer Plasma 400 ICP/AE spectrophotometer for carbon content. The carbon content was then used to calculate the ligand content of the sorbent. Both the imprint-coated mesoporous sorbents of the present invention and the blank-coated mesoporous sorbents controls exhibit similar ligand loadings.

Table 1 summarizes the measured adsorption capacities for the $Cu^{2+}$ imprint-coated sorbents of the present invention, $Cu^{2+}$ imprint-coated sorbents made by conventional methods, and blank control sorbents made by each method. The $Cu^{2+}$ solutions contain 0.001 or 0.0001 moles of $Cu^{2+}$ ions at a pH of 5.0 in a buffered mixture of acetic acid and sodium acetate. The sodium acetate mixture is approximately 0.05M with a sodium acetate:acetate ratio of approximately 2.29:1. In each of these experiments, 0.1 g of each sample was equilibrated with 10 ml of the buffer solution in stoppered plastic vials, and these mixtures were stirred for 1 hour at room temperature. The uptake of $Cu^{2+}$ by sorbents was measured with a Perkin Elmer Plasma 400 ICP/AE spectrophotometer. Both of the imprinted sorbents exhibit distinctly more effective capacities for $Cu^{2+}$ than their respective control blanks. Furthermore, their capacity does not change after repeated cycles of loading and elution. These properties make them ideal for many separation applications requiring recyclable solid phases.

TABLE 1

| Type | Solution | % Cu Abs | Cu $K_d$** | Cu Capacity (mmol/g) |
|---|---|---|---|---|
| Nonimp-APTS*** | 0.001 M Cu | 98.2 | 5300 | 0.098 |
| imp-APTS**** | 0.001 M Cu | 99.6 | 26000 | 0.1 |
| Nonimp-AAPTS | 0.001 M Cu | 98.5 | 6800 | 0.099 |
| imp-AAPTS | 0.001 M Cu | 99.7 | 39000 | 0.1 |
| Nonimp-AAPTS | 0.0001 M Cu | 99.2 | 14000 | 0.0099 |
| imp-AAPTS | 0.0001 M Cu | 100* | — | — |

*No detectable copper ions were found in the solution after treatment.
**$K_d$ = {$(C_i - C_f)/C_f$} ({Volume Solution (ml)}/{Mass Gel (gram)}; where $C_i$ and $C_f$ represent the initial and final solution concentrations, respectively.
***nonimp-APTS = sorbent coated by the conventional method.
****imp-APTS = sorbent coated by the surface molecular imprinting.

EXAMPLE 7

Selectivity of $Cu^{2+}$-selective Sorbents

The selectivities of the sorbents of the present invention were investigated in competitive binding experiments using aqueous $Cu^{2+}/Zn^{2+}$ mixtures. This system constitutes one of the most stringent tests for ion binding selectivity because both ions have identical charge, similar sizes, and exhibit high affinities for amine ligands. If a sorbent is simultaneously exposed to mixtures of different metal ions, preferential binding of those ions with the highest binding affinity will be observed. The selectivity coefficient, k, for the binding of a specific metal ion in the presence of competitor species can be obtained from equilibrium binding data according to equation (2):

$$M1(\text{solution})+M2(\text{sorbent}) 7 M2(\text{solution})+M1(\text{sorbent}) \quad (1)$$

$$k=\{[M2]\text{solution }[M1]\text{sorbent}\}/\{[M1]\text{solution }[M2]\text{sorbent}\}= K_d(\text{Cu})/K_d(\text{Zn}) \quad (2)$$

where $K_d$ is the distribution coefficient. Comparison of the k values of the imprint-coated sorbents with those for control blank samples allows an estimation of the effect of imprinting on selectivity. Following the work by Kuchen and Schram (Angew. Chem. Int. Ed.: 27, 1695–1679; 1988), a relative selectivity coefficient, k', [equation (3)] can be defined.

$$k'=k\text{imprinting-coated}/k \text{ blank} \quad (3)$$

Table 2 summarizes $K_d$ and k' values obtained in the selectivity tests for zinc and copper. Competitive loading of $Cu^{2+}$ ($M_1$) and $Zn^{2+}$ ($M_2$) by $Cu^{2+}$-selective sorbents of the present invention and by control blank mesoporous sorbents at pH 5.0 (acetic acid/acetate buffer).

TABLE 2

| Type | nonimp-APTS | imp-APTS | nonimp-AAPTS | imp-AAPTS | nonimp-AAPTS | imp-AAPTS |
|---|---|---|---|---|---|---|
| *Cu Conc. (mol/L) | 0.001 | 0.001 | 0.001 | 0.001 | 0.001 | 0.001 |
| *Zn Conc. (mol/L) | 0.01 | 0.01 | 0.001 | 0.001 | 0.005 | 0.005 |
| % Cu Abs | 35.4 | 53.2 | 98.5 | 99.8 | 98.5 | 99.6 |
| % Zn Abs | 63.3 | 68 | 96.6 | 82.9 | 70 | 52.6 |
| Cu $K_d$ | 55 | 114 | 6543 | 44045 | 6539 | 23874 |
| Zn $K_d$ | 173 | 212 | 2872 | 483 | 233 | 111 |
| K (Cu) | 0.3 | 0.51 | 2.3 | 91 | 28 | 220 |
| K (Zn) | — | 1.7 | — | 40 | — | 7.7 |

*Initial solutions.

Figure 2:
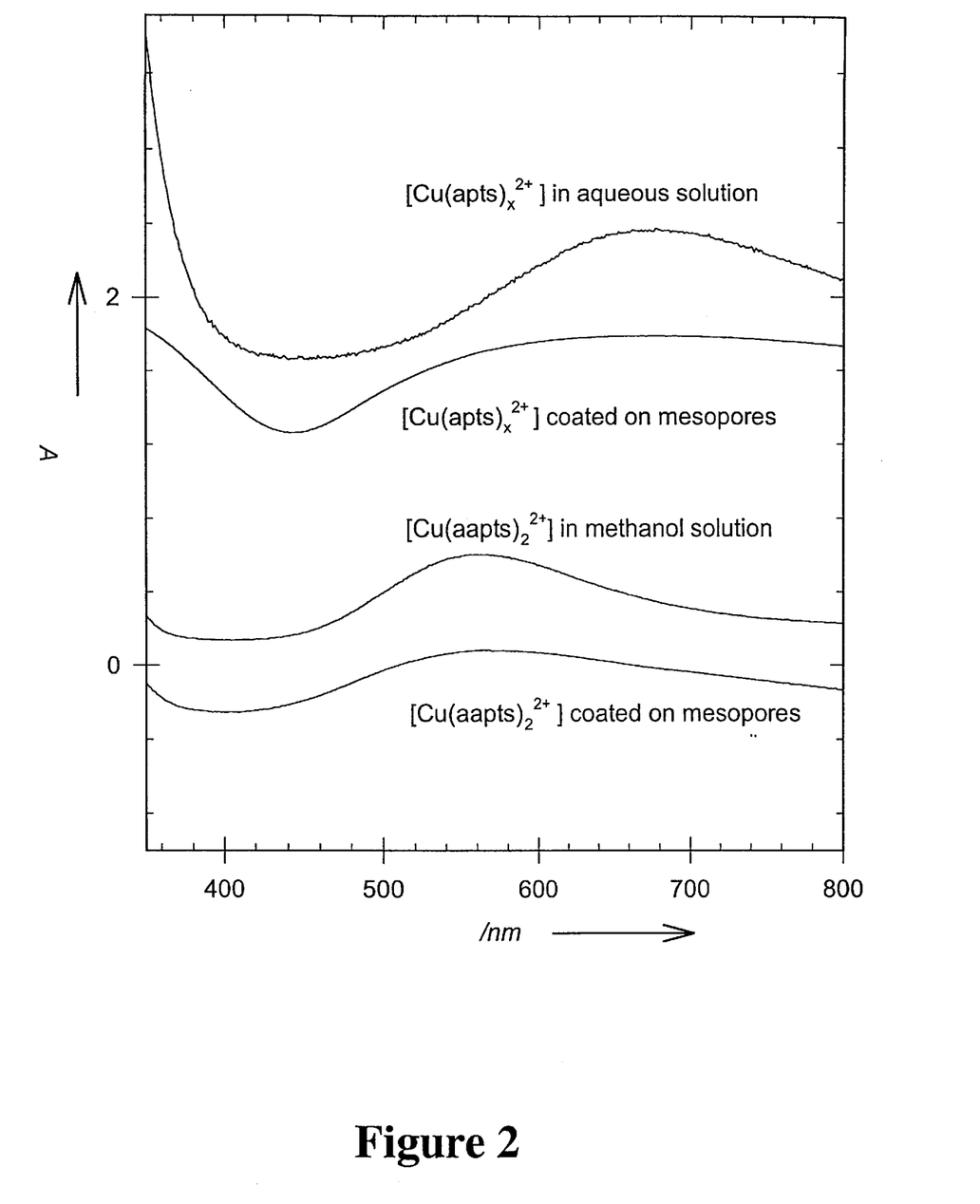
FIG. 2 depicts an UV-vis spectrum of APTS-imprint-coated sorbents.
Figure 3:
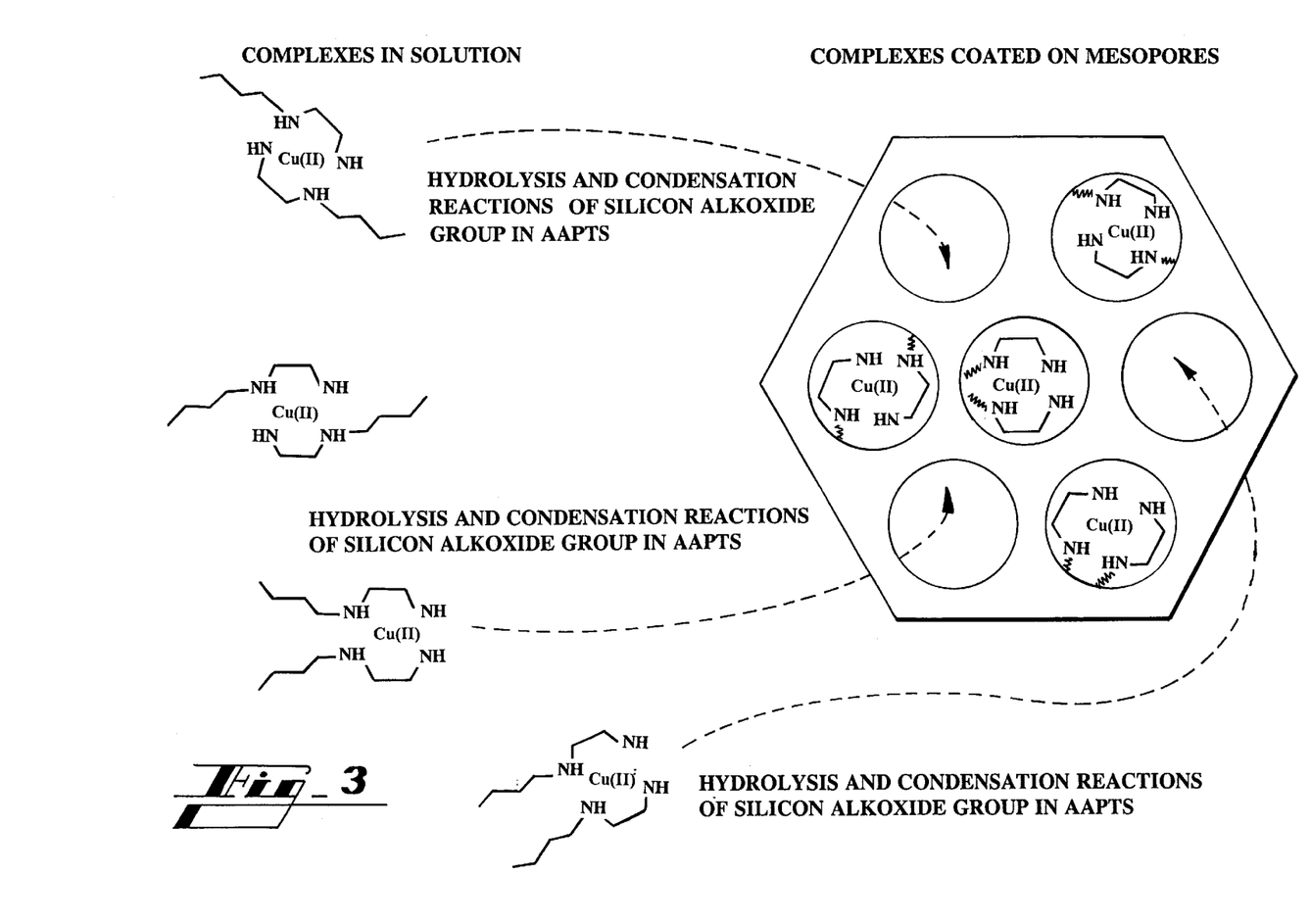
FIG. 3 is a schematic illustration of the imprint-coating process.
Figure 4:
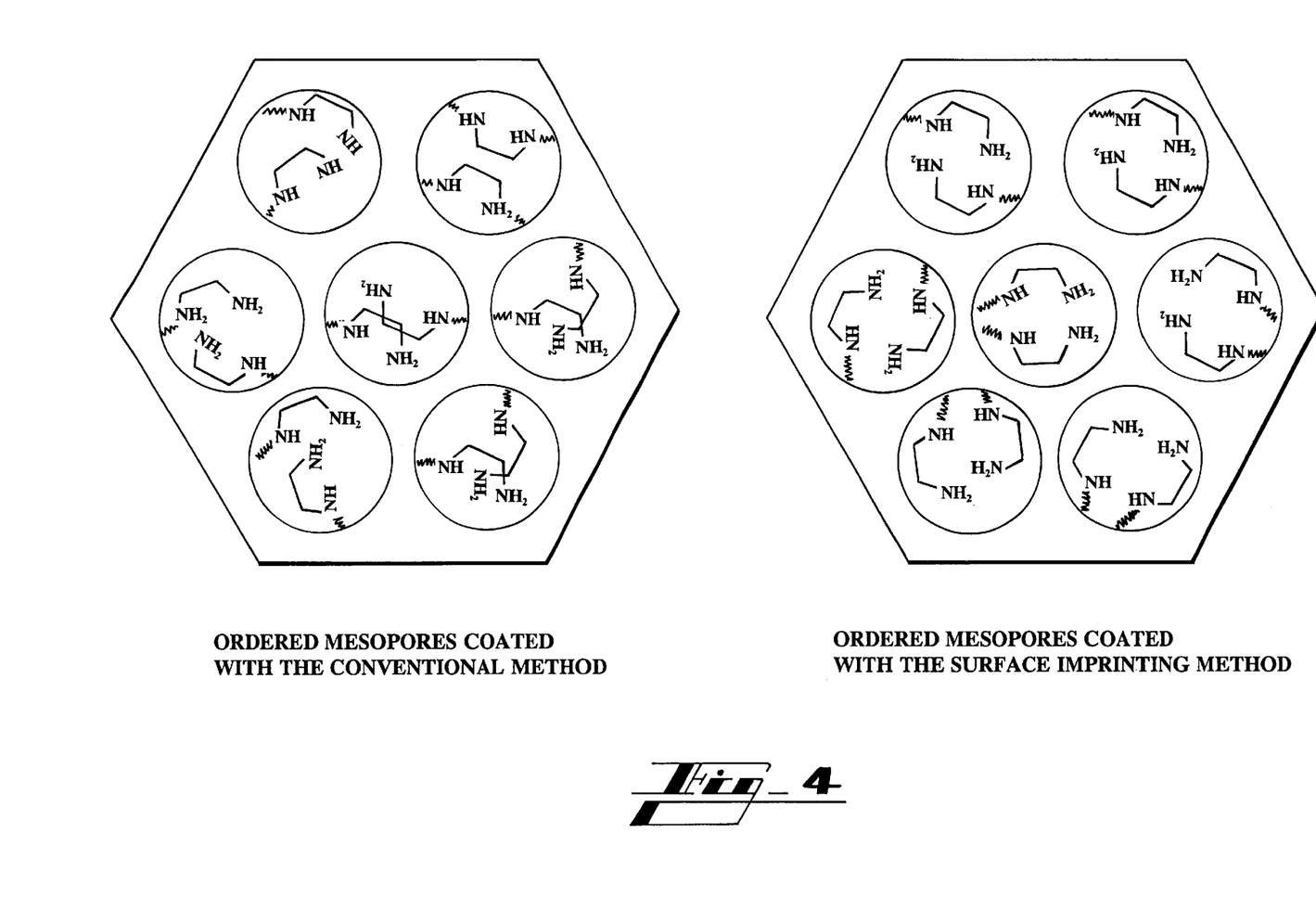
FIG. 4 illustrates the difference in the final cavity structure between the imprint-coated mesoporous sorbents of the present invention and conventionally coated mesoporous sorbents.

Comparison of the $K_d$ values for $Cu^{2+}$-imprinted AAPTS-coated sorbents with control samples shows a sixfold increase in $K_d$ for $Cu^{2+}$, while $K_d$ for $Zn^{2+}$ decreases by the same amount. The value of k' is greater than 1 for all imprint-coated sorbents. A k' value of 40 for AAPTS-imprint-coated sorbent is significantly higher than values currently reported for conventional molecular imprinting of metal ions in similar conditions. The value of k' (1.71) for the APTS-imprinted sorbent is smaller than that for the AAPTS ligand. This may be attributed to the flexibility of the propyl chain linking the monodentate amine to the support, which allows for easy redirection of the ligand and a larger range of coordination geometries for these ligands. Accordingly, coordination to a metal ion is less specific and therefore less selective for the target ion. In fact, this also agrees with the optical spectra (FIG. 2) that indicate a broad distribution of the ligand imprints in the APTS-imprint-coated sorbent.

In contrast to the results described above, imprint coating on the surfaces of commercial, amorphous silica gel [Aldrich, <d> 60 Å; surface area=600 m²/g] showed very little evidence of imprinting effects in selectivity experiments. This is consistent with the idea that the shape and curvature of the pore surfaces play pivotal roles in the success of the surface imprinting of inorganic coordination complexes.

All patents, publications and abstracts cited above are incorporated herein by reference in their entirety.

It should be understood that the foregoing relates only to preferred embodiments of the present invention and that numerous modifications or alterations may be made therein without departing from the spirit and the scope of the present invention as defined in the following claims.

We claim the following:

1. A process for the preparation of an ordered mesoporous sorbent comprising:
    (a) mixing an imprint coating precursor and an ordered mesoporous substrate to form a coated mesoporous substrate wherein the imprint coating precursor comprises a template molecule bound to one end of more than one bifunctional ligand;
    (b) treating the coated mesoporous substrate with an acid solution;
    (c) evaporating the mixture; and
    (d) titrating the coated mesoporous substrate to a neutral pH to form the ordered mesoporous sorbent.

2. The process of claim 1 further comprising filtering and washing the ordered mesoporous sorbent in deionized water, followed by vacuum drying.

3. The process of claim 1 wherein the imprint coating precursor is prepared by a process comprising dissolving a template molecule in a solvent and adding a bifunctional ligand to the solution.

4. The process of claim 3 wherein the template molecule is a metal ion, an amino acid, or an organic molecule.

5. The process of claim 4 wherein the metal ion is selected from the group consisting of $Ag^+$, $Al^{3+}$, $Am^{3+}$, $As^{3+}$, $Au^+$, $Au^{3+}$, $Ba^{2+}$, $Be^{2+}$, $Bi^{3+}$, $Br^+$, $Ca^{2+}$, $Cd^{2+}$, $Ce^{3+}$, $Ce^{4+}$, $Cf^{3+}$, $CH_3Hg^+$, $Cm^{3+}$, $Co^{2+}$, $Co^{3+}$, $Co(NH_3)_6^{3+}$, $Cr^{3+}$, $Cr^{6+}$, $Cs^+$, $Cu^+$, $Cu^{2+}$, $Cu(\text{alanine})_2^+$, $Cuen_2^{2+}$, $Coen_2^{3+}$, $Dy^{3+}$, $Er^{3+}$, $Eu^{3+}$, $Fe^{2+}$, $Fe^{3+}$, $Fe(CN)_5NO^{2-}$, $Ga^{3+}$, $Gd^{3+}$, $H^+$, $Hg^{2+}$, $Hg_2^{2+}$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_2^+$, $P$, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $ReO_4^-$, $Rh^{3+}$, $Ru$, $S$, $Sb^{3+}$, $Sb^{5+}$, $Sc^{3+}$, $Se$, $Sm^{3+}$, $Sn^{2+}$, $Sr^{2+}$, $Tb^{3+}$, $TcO_4^-$, $Th^{4+}$, $Ti^{3+}$, $Tl^+$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, and $Zr^{4+}$.

6. The process of claim 5 wherein the metal ion is selected from the group consisting of $Au^{3+}$, $Hg^{2+}$, $Sr^{2+}$, $Cs^+$, $Ni^{2+}$, $Pb^{2+}$, $TcO^{4-}$, $UO_2^{2+}$, $Th^{4+}$, $Ag^+$, $Co^{2+}$, $Cu^{2+}$, $Zn^{2+}$, and $ReO^{4-}$.

7. The process of claim 4 wherein the amino acid is selected from the group consisting of alanine, aminomalonic acid, anthanilic acid, arginine, asparagine, aspartate, aspartic acid, betaine, carboxyglutamate, citrulline, cysteine, cystine, diglycine, dipicolinic acid, ethionine, N-ethylglycine, glutamate, glutamic acid, glutamine, glycine, histidine, homoserine, isoleucine, isoserine, leucine, lysine, methionine, nicotinic acid, norleucine, norvaline, pencillamine, pentaglycine, phosphoserine, sarcosine, sarcosylglycine, serine, spinacine, tryptophan, tyrosine, valine and modified versions thereof.

8. The process of claim 4 wherein the organic molecule is selected from the group consisting of a cytokine, an ionophore, an ion channel agonist or antagonist, a monokine, a small hormone, an electrolyte, glucose, TNT, cocaine, a bioactive molecule, a neurotransmitter, a salt, a carbohydrate, a sugar, an amino acid, an herbicide, a pharmaceutical drug, an aldehyde, a ketone, an ether, a carboxylic acid, an ester, an amine, and an amide.

9. The process of claim 3 wherein the bifunctional ligand is selected from the group consisting of APTS, AAPTS, BAAPTS, BSAPTS, BSSAPTS, BSSSAPTS, BTMSPTS, DEPETS, DETESPM, TMPT, TSPBC, TSPGC, and TSPMC.

10. The process of claim 1 wherein the mesoporous substrate is prepared by a process comprising:
(a) mixing an ammonium halide, water, and a base;
(b) adding a metal alkoxide to the mixture;
(c) heating the mixture to a temperature of about 60° C. to about 80° C. for about 14 hours to about 20 hours; and
(d) recovering the solid, ordered mesoporous substrate.

11. The process of claim 10 wherein the ammonium halide is selected from the group consisting of cetyltrimethylammonium bromide and cetyltrimethylammonium chloride.

12. The process of claim 10 wherein the base is selected from the group consisting of sodium hydroxide, ammonium hydroxide, lithium hydroxide, potassium hydroxide, calcium hydroxide, and magnesium hydroxide.

13. The process of claim 10 wherein the metal alkoxide is selected from the group consisting of a silicate, a titanate, and a zirconate.

14. The process of claim 13 wherein the silicate is selected from the group consisting of tetraethylorthosilicate, tetramethylorthosilicate, and tetrabutylorthosilicate.

15. The process of claim 13 wherein the titanate is selected from the group consisting of tetraethylorthotitanate, tetra-tert-butylorthotitanate, tetraisopropylorthotitanate, tetrabutylorthotitanate, and tetrapropylorthotitanate.

16. The process of claim 13 wherein the zirconate is selected from the group consisting of tetrapropylzirconate, zirconium (IV) tert-butoxide, zirconium (IV) butoxide, zirconium (IV) isopropoxide.

17. The process of claim 1 wherein the acid is a mineral acid.

18. The process of claim 17 wherein the mineral acid is selected from the group consisting of nitric acid, sulfuric acid, and hydrochloric acid.

19. The process of claim 1 wherein the solvent is selected from the group consisting of water, a protic solvent, and dimethyl sulfoxide.

20. The process of claim 19 wherein the protic solvent is selected from the group consisting of methanol, ethanol, and propanol.

21. The process of claim 1 wherein the coated mesoporous substrate is titrated with a base.

22. The process of claim 21 wherein the base is selected from the group consisting of sodium hydroxide, ammonium hydroxide, lithium hydroxide, potassium hydroxide, calcium hydroxide, and magnesium hydroxide.

23. An ordered mesoporous sorbent comprising bifunctional ligands bound to the surface of an ordered mesoporous substrate wherein the mesoporous substrate contains concave porous surfaces and the bifunctional ligands are bound to form tailored binding pockets for a target molecule wherein the tailored binding pocket is formed from a template molecule bound to one end of more than one bifunctional ligand.

24. The ordered mesoporous sorbent of claim 23 wherein the bifunctional ligands are selected from the group consisting of APTS, AAPTS, BAAPTS, BSAPTS, BSSAPTS, BSSSAPTS, BTMSPTS, DEPETS, DETESPM, TMPT, TSPBC, TSPGC, and TSPMC.

25. The ordered mesoporous sorbent of claim 23 wherein the ordered mesoporous substrate is selected from the group consisting of a silicate, a titanate, and a zirconate.

26. The ordered mesoporous sorbent of claim 25 wherein the silicate is selected for the group consisting of tetraethylorthosilicate, tetramethylorthosilicate, and tetrabutylorthosilicate.

27. The ordered mesoporous sorbent of claim 25 wherein the titanate is selected from the group consisting of tetraethylorthotitanate, tetra-tert-butyl-orthotitanate, tetraisopropyl orthotitanate, tetrabutylorthotitanate, and tetrapropylorthotitanate.

28. The ordered mesoporous sorbent of claim 25 wherein the zirconate is selected from the group consisting of tetrapropylzirconate, zirconium (IV) tert-butoxide, zirconium (IV) butoxide, zirconium (id) isopropoxide.

29. The ordered mesoporous sorbent of claim 23 wherein the target molecule is a metal ion, an amino acid, or an organic small molecule.

30. The ordered mesoporous sorbent of claim 29 wherein the metal ion is selected from the group consisting of $Ag^+$, $Al^{3+}$, $Am^{3+}$, $As^{3+}$, $Au^+$, $Au^{3+}$, $Ba^{2+}$, $Be^{2+}$, $Bi^{3+}$, $Br^+$, $Ca^{2+}$, $Cd^{2+}$, $Ce^{3+}$, $Ce^{4+}$, $Cf^{3+}$, $CH_3Hg^+$, $Cm^{3+}$, $Co^{2+}$, $Co^{3+}$, $Co(NH_3)_6^{3+}$, $Cr^{3+}$, $Cr^{6+}$, $Cs^+$, $Cu^{2+}$, $Cu(alanine)_2^{2+}$; $Cuen_2^{2+}$, $Coen_2^{3+}$, $Dy^{3+}$, $Er^{3+}$, $Eu^{3+}$, $Fe^{2+}$, $Fe^{3+}$, $Fe(CN)_5NO^{2-}$, $Ga^{3+}$, $Gd^{3+}$, $H^+$, $Hg^{2+}$, $Hg_2^{2+}$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_2^+$, P, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $ReO_4^-$, $Rh^{3+}$, Ru, S, $Sb^{3+}$, $Sb^{5+}$, $Sc^{3+}$, Se, $Sm^{3+}$, $Sn^{2+}$, $Sr^{2+}$, $Tb^{3+}$, $TcO_4^-$, $Th^{4+}$, $Ti^{3+}$, $Tl^+$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, and $Zr^{4+}$.

31. The order mesoporous sorbent of claim 30 wherein the metal ion is selected from the group consisting of $Au^{3+}$, $Hg^{2+}$, $Sr^{2+}$, $Cs^+$, $Ni^{2+}$, $Pb^{2-}$, $TcO^{4-}$, $UO_2^{2+}$, $Th^{4+}$, $Ag^+$, $Co^{2+}$, $Cu^{2+}$, $Zn^{2+}$, and $ReO^{4-}$.

32. The ordered mesoporous sorbent of claim 29 wherein the amino acid is selected from the group consisting of alanine, aminomalonic acid, anthanilic acid, arginine, asparagine, aspartate, aspartic acid, betaine, carboxyglutamate, citrulline, cysteine, cystine, diglycine, dipicolinic acid, ethionine, N-ethylglycine, glutamate, glutamic acid, glutamine, glycine, histidine, homoserine, isoleucine, isoserine, leucine, lysine, methionine, nicotinic acid, norleucine, norvaline, pencillamine, pentaglycine, phosphoserine, sarcosine, sarcosylglycine, serine, spinacine, tryptophan, tyrosine, valine and modified versions thereof.

33. The ordered mesoporous sorbent of claim 29 wherein the organic small molecule is selected from the group consisting of a cytokine, an ionophore, an ion channel agonist or antagonist, a monokine, a small hormone, an electrolyte, glucose, TNT, cocaine, a bioactive molecule, a neurotransmitter, a salt, a carbohydrate, a sugar, an amino acid, an herbicide, a pharmaceutical drug, an aldehyde, a ketone, an ether, a carboxylic acid, an ester, an amine, and an amide.

34. An ordered mesoporous sorbent prepared by the process comprising:
(a) mixing an imprint coating precursor and an ordered mesoporous substrate to form a coated mesoporous substrate wherein the imprint coating precursor comprises a template molecule bound to one end of more than one bifunctional ligand;
(b) treating the coated mesoporous substrate with an acid solution;
(c) evaporating the mixture; and
(d) titrating the coated mesoporous substrate to a neutral pH to form the ordered mesoporous sorbent.

35. The ordered mesoporous sorbent of claim 34 wherein the imprint coating precursor is prepared by a process comprising dissolving a template molecule in a solvent and adding a bifunctional ligand to the mixture.

36. The ordered mesoporous sorbent of claim 35 wherein the bifunctional ligand is selected from the group consisting of APTS, AAPTS, BAAPTS, BSAPTS, BSSAPTS, BSSSAPTS, BTMSPTS, DEPETS, DETESPM, TMPT, TSPBC, TSPGC, and TSPMC.

37. The ordered mesoporous sorbent of claim 34 wherein the mesoporous substrate is prepared by a process comprising:

(a) mixing an ammonium halide, water, and a base;

(b) adding a metal alkoxide to the mixture;

(c) heating the mixture to a temperature of about 60° C. to about 80° C. for about 14 hours to about 20 hours; and (d) recovering the solid, ordered mesoporous substrate.

38. A process for the removal of a target molecule from a sample comprising contacting the sample containing the target molecule with an ordered mesoporous sorbent as defined in claim 23.

39. The process of claim 38 wherein the target molecule is a metal ion, an amino acid, or an organic small molecule.

40. The process of claim 39 wherein the metal ion is selected from the group consisting of $Ag^+$, $Al^{3+}$, $Am^{3+}$, $As^{3+}$, $Au^+$, $Au^{3+}$, $Ba^{2+}$, $Be^{2+}$, $Bi^{3+}$, $Br^+$, $Ca^{2+}$, $Cd^{2+}$, $Ce^{3+}$, $Ce^{4+}$, $Cf^{3+}$, $CH_3Hg^+$, $Cm^{3+}$, $Co^{2+}$, $Co^{3+}$, $Co(NH_3)_6^{3+}$, $Cr^{3+}$, $Cr^{6+}$, $Cs^+$, $Cu^+$, $Cu^{2+}$, $Cu(alanine)_2^{2+}$, $Cuen_2^{2+}$, $Coen_3^{3+}$, $Dy^{3+}$, $Er^{3+}$, $Eu^{3+}$, $Fe^{2+}$, $Fe^{3+}$, $Fe(CN)_5NO^{2-}$, $Ga^{3+}$, $Gd^{3+}$, $H^+$, $Hg^{2+}$, $Hg_2^{2+}$, $Ho^{3+}$, $In^{3+}$, $Ir^{3+}$, $Ir^{4+}$, $K^+$, $La^{3+}$, $Li^+$, $Lu^{3+}$, $Mg^{2+}$, $Mn^{2+}$, $Mo^{4+}$, $Mo^{5+}$, $Mo^{6+}$, $Na^+$, $Nb^{5+}$, $Nd^{3+}$, $Ni^{2+}$, $Np^{4+}$, $NpO_2^+$, P, $Pb^{2+}$, $Pd^{2+}$, $Po^{2+}$, $Pr^{3+}$, $Pt^{2+}$, $Pu^{3+}$, $Pu^{4+}$, $Pu^{6+}$, $Re^{7+}$, $ReO_4^-$, $Rh^{3+}$, Ru, s, $Sb^{3+}$, $Sb^{5+}$, $Sc^{3+}$, Se, $Sm^{3+}$, $Sn^{2+}$, $Sr^{2+}$, $Tb^{3+}$, $TcO_4^-$, $Th^{4+}$, $Ti^{3+}$, $Tl^+$, $Tl^{3+}$, $Tm^{3+}$, $U^{4+}$, $UO_2^{2+}$, $V^{2+}$, $VO^{2+}$, $V^{3+}$, $V^{5+}$, $W^{6+}$, $Y^{3+}$, $Yb^{3+}$, $Zn^{2+}$, and $Zr^{4+}$.

41. The process of claim 40 wherein the metal ion is selected from the group consisting of $Au^{3+}$, $Hg^{2+}$, $Sr^{2+}$, $Cs^+$, $Ni^{2+}$, $Pb^{2+}$, $TcO^{4-}$, $UO_2^{2+}$, $Th^{4+}$, $Ag^+$, $Co^{2+}$, $Cu^{2+}$, $Zn^{2+}$, and $ReO^{4-}$.

42. The process of claim 39 wherein the amino acid is selected from the group consisting of alanine, aminomalonic acid, anthanilic acid, arginine, asparagine, aspartate, aspartic acid, betaine, carboxyglutamate, citrulline, cysteine, cystine, diglycine, dipicolinic acid, ethionine, N-ethylglycine, glutamate, glutamic acid, glutamine, glycine, histidine, homoserine, isoleucine, isoserine, leucine, lysine, methionine, nicotinic acid, norleucine, norvaline, pencillamine, pentaglycine, phosphoserine, sarcosine, sarcosylglycine, serine, spinacine, tryptophan, tyrosine, valine and modified versions thereof.

43. The process of claim 39 wherein the organic small molecule is selected from the group consisting of a cytokine, an ionophore, an ion channel agonist or antagonist, a monokine, a small hormone, an electrolyte, glucose, TNT, cocaine, a bioactive molecule, a neurotransmitter, a salt, a carbohydrate, a sugar, an amino acid, an herbicide, a pharmaceutical drug, an aldehyde, a ketone, an ether, a carboxylic acid, an ester, an amine, and an amide.

44. The process of claim 38 wherein the target molecule is present in an industrial process stream.

45. The process of claim 38 wherein the target molecule is present in a mining effluent.

46. The process of claim 38 wherein the target molecule is present in a biological sample.

47. The process of claim 38 wherein the target molecule is a biological or organic molecule.

48. The process of claim 38 wherein the sample is a biological or organic solution.

49. A process for the detection, quantification, and/or removal of a target molecule in a sample comprising contacting the sample with an ordered mesoporous sorbent as defined in claim 23.

50. A process for the detection, quantification, and/or removal of a target molecule in a sample comprising passing the sample through a chromatography column or precolumn which comprises an ordered mesoporous sorbent as defined in claim 23.

51. The method of claim 50 wherein the target molecule is a biological molecule.

52. The method of claim 50 wherein the target molecule is an organic compound.

53. The method of claim 50 wherein the target molecule is a metal ion.

* * * * *